(12) United States Patent
Wengrovitz et al.

(10) Patent No.: US 9,179,103 B2
(45) Date of Patent: Nov. 3, 2015

(54) SYSTEM AND METHOD FOR CONTROLLABLY VIEWING DIGITAL VIDEO STREAMS CAPTURED BY SURVEILLANCE CAMERAS

(75) Inventors: Michael S. Wengrovitz, Concord, MA (US); Senthil Kumar, Marlboro, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 389 days.

(21) Appl. No.: 12/892,647

(22) Filed: Sep. 28, 2010

(65) Prior Publication Data

US 2012/0075465 A1  Mar. 29, 2012

(51) Int. Cl.
*H04N 7/18*  (2006.01)

(52) U.S. Cl.
CPC ..................... *H04N 7/181* (2013.01)

(58) Field of Classification Search
CPC ............. H04N 7/50; H04N 7/68; H04N 7/64; H04N 7/26244; H04N 21/2383
USPC ........................ 375/240.01–240.29
See application file for complete search history.

(56) References Cited

U.S. PATENT DOCUMENTS

| | | | |
|---|---|---|---|
| 5,832,173 A * | 11/1998 | Terasawa et al. | 386/343 |
| 6,204,886 B1 | 3/2001 | Yoshimura | |
| 2002/0170064 A1 | 11/2002 | Monroe | |
| 2003/0059047 A1 * | 3/2003 | Iwamura | 380/201 |
| 2008/0049142 A1 * | 2/2008 | Schohn et al. | 348/569 |

FOREIGN PATENT DOCUMENTS

| | | |
|---|---|---|
| JP | 2004194200 A | 7/2004 |
| JP | 2004247817 A | 9/2004 |
| JP | 2004336127 A | 11/2004 |
| JP | 2006049941 A | 2/2006 |
| JP | 2007158879 A | 6/2007 |
| JP | 2008167423 A | 7/2008 |
| JP | 2009212716 A | 9/2009 |
| WO | 0135647 A1 | 5/2001 |
| WO | 2008069344 A1 | 6/2008 |

OTHER PUBLICATIONS

International Search Report and Written Opinion: PCT/US2011/051708 dated Dec. 20, 2011.

* cited by examiner

*Primary Examiner* — Andy Rao
(74) *Attorney, Agent, or Firm* — Loza & Loza, LLP

(57) ABSTRACT

A digital video management device enables controllably viewing digital video streams captured by remote surveillance cameras on a display device, such as a mobile display device. The device is coupled to a packet-switched network to receive a digital video stream captured by a remote surveillance camera. The device buffers packets of the digital video stream and then controls a packet output flow rate of the buffer between a zero output rate and a faster-than-real-time output rate. For example, the packet output flow rate can be set to the zero output rate at a first time and the faster-than-real-time output rate at a second time subsequent to the first time.

16 Claims, 5 Drawing Sheets

SYSTEM AND METHOD FOR CONTROLLABLY VIEWING DIGITAL VIDEO STREAMS CAPTURED BY SURVEILLANCE CAMERAS

BACKGROUND OF THE INVENTION

1. Technical Field of the Invention

The present invention relates in general to video surveillance systems and in particular, to viewing digital video streams from video surveillance cameras.

2. Description of Related Art

Smartphones and other mobile devices having high-resolution touch screens and high-speed network access are becoming commonplace in the marketplace. Similarly, IP-video surveillance cameras and legacy analog surveillance cameras enabled with IP-encoders are now widely deployed on city streets, in airports, and in many other public facilities. Security companies have expressed interest in being able to view the surveillance camera streams in real-time on mobile devices coupled to the IP network. However, the small screen size of a typical mobile device currently makes viewing multiple video streams in parallel impractical.

One solution is to display the multiple video streams simultaneously, but with each having reduced window size and resolution. However, the smaller video window size can cause a human viewer to miss important or critical information. Another solution is to cycle or toggle between multiple video streams, so that only a single stream, or a few streams of the total set are displayed in full resolution at one time. For example, a typical video surveillance screen might show Camera-1 for the first 10 seconds, Camera-2 for the next 10 seconds, Camera-N for the next 10 seconds, etc. and then repeat back to Camera-1. However, critical activity happening within Camera-1's field-of-view may not be seen while Cameras 2-N are being viewed.

Digital video buffering is also commonly utilized in many digital video devices, such as personal video recorders (PVRs) and digital video recorders (DVRs). For example, in a conventional DVR system, a user can watch television (TV) in real-time, pause the video, and then continue watching the video in real-time but with a delay. The user could also watch the video at 2× or 4× the speed in order to catch-up with the real-time television show. In some DVR systems, a user might even be able to watch two channels of TV at the same time in this way, i.e., watching one channel for some time while the second channel is paused, then watching the second channel for some time while the first channel is paused. However, this process is manual and extremely cumbersome. As such, the human viewer may quickly fall-behind watching both TV shows. Moreover, this process would be nearly impossible for more than two channels of video.

SUMMARY OF THE INVENTION

A digital video management device, in one embodiment, enables controllably viewing digital video streams captured by remote surveillance cameras on a display device. The digital video management device includes an input interface, a buffer, a processor and an output interface. The input interface is coupled to a packet-switched network to receive a digital video stream captured by a remote surveillance camera. The buffer receives and stores packets of the digital video stream and the processor controls a packet output flow rate of the buffer between a zero output rate and a faster-than-real-time output rate. The processor sets the packet output flow rate to a zero output rate at a first time and to a faster-than-real-time output rate at a second time subsequent to the first time. The output interface provides the digital video stream to the display device for display thereon at the faster-than-real-time output rate at the second time.

In further embodiments, the processor sets the packet output flow rate to a real-time output rate at a third time subsequent to the second time. For example, the processor can set the packet output flow rate to a variable output rate between the second time and the third time. The processor may determine the variable output rate based on a current depth of the buffer at the second time or using video analytics.

In still further embodiments, the input interface is further coupled to receive at least one additional digital video stream captured by at least one additional remote video surveillance system, and store the at least one additional digital video stream within at least one additional buffer. The processor further controls the packet output flow rate of the at least one additional buffer to enable selected digital video streams of the digital video stream and the at least one additional digital video stream to be rendered on the display device. For example, the processor can pause non-selected digital video streams of the digital video stream and the at least one additional digital video stream by setting the packet output flow rate of the non-selected digital video streams to the zero output rate. As another example, the processor can use one or more of a predetermined policy, video analytics and user input of a user of the display device to determine the selected digital video streams and the respective packet output flow rates of the selected digital video streams.

In yet a further embodiment, the processor further adjusts a spatial resolution of the selected digital video streams to display one or more regions of interest within the selected digital video streams on the display device. For example, the processor can adjust the spatial resolution by zooming in on the one or more regions of interest, increasing the resolution of the one or more regions of interest using a super-resolution technique or resizing the one or more regions of interest.

In another embodiment of the invention, a method enables controllably viewing digital video streams captured by remote surveillance cameras on a display device. The method includes receiving a digital video stream captured by a remote surveillance camera, buffering packets of the digital video stream within a buffer, controlling a packet output flow rate of the buffer between a zero output rate at a first time and a faster-than-real-time output rate at a second time subsequent to the first time and providing the digital video stream to a display device for display thereon at the faster-than-real-time output rate at the second time.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

In accordance with embodiments of the present invention, systems and methods are provided for controllably viewing one or more surveillance camera streams. Real-time surveillance video streams can be rendered, for example, on mobile devices with small screens or on large-screen displays and/or video walls, where the number of surveillance cameras being viewed is large. In addition, embodiments of the present invention can also be extended to include real-time playback and analysis of existing digital video recordings.

Figure 1:
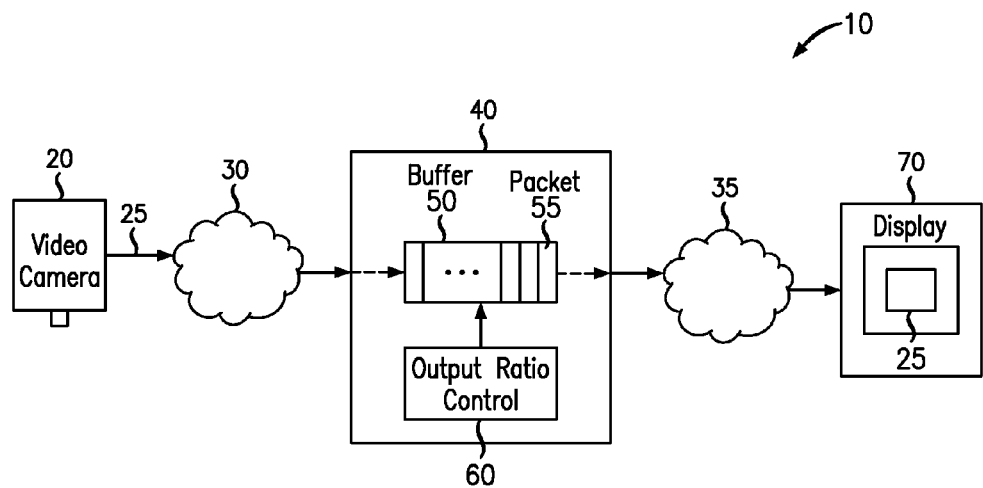
FIG. 1 illustrates an exemplary digital video system for controllably viewing a digital video stream captured by a remote surveillance camera, in accordance with embodiments of the present invention.

FIG. 1 illustrates an exemplary digital video system 10 for controllably viewing a digital video stream captured by a remote surveillance camera, in accordance with embodiments of the present invention. The system 10 includes a video camera 20, a digital video management device 40 and a display 70. The display 70 may be a single display 70, such as a display on a mobile device or a security system display, or may include multiple displays, such as a security system video wall. The device 40 may be, for example, a server within a network or a mobile phone housing the display 40. In embodiments in which the device 40 is a server, the device 40 is coupled to the display through a network, such as an Internet Protocol (IP) network 35 (e.g., via Wifi, 3G, 4G or other means) or other type of network.

The device 40 is further coupled to the remote video surveillance camera 20 via another network 30, which may be, for example, a packet-switched (e.g., IP) network, circuit-switched network or combination thereof. A digital video stream 25 captured by the remote video surveillance camera 20 is received at the device 40 and buffered into buffer 50. The digital video stream 25 may be, for example, a real-time stream or a prerecorded stream. An output rate control module 60 optimally adjusts the output rate of the buffer 50 to render the digital video stream 25 on the display 70 at an appropriate rate. More particularly, the buffer 50 receives and stores packets 55 of the digital video stream 25, and the output rate control module 60 controls the packet output flow rate of the buffer 50 between a zero output rate and a faster-than-real-time output rate. For example, the output rate control module 60 can set the packet output flow rate to a zero output rate at a first time and then set the packet output flow rate to a faster-than-real-time output rate at a second time. The output rate control module 60 can further set the packet output flow rate of the buffer 50 to a real-time rate at a third time. The adjustment of the output flow rate enables a user viewing the display 70 to ensure that no important information from the video stream 25 is missed due to viewer inattention or other inability to observe one or more streams displayed on the display 70.

In general, the output rate control module 60 can adjust the output flow rate dependent upon many factors. For example, if an end-user manually pauses the video on the display 70, the output rate control module 60 can set the output flow rate to zero, which causes the video buffer 50 to begin to fill. After un-pausing the video, the output rate control module 60 can adjust the output flow rate at an adjustable rate determined based on policy, video analytics or user input. For example, a policy or user input can instruct the output rate control module 60 to output the oldest video fastest, or at a rate dependent on buffer depth, scene complexity and/or other factors. As another example, video analytics can be applied to the digital video stream 25 to enable video with complicated content to be output at a slower rate and video with simpler content to be output at a faster rate.

In an exemplary embodiment in which the device 40 is within the network and the buffer stores compressed (e.g., MPEG4) video, the compressed video can be transmitted across the IP network 35 at a faster rate, then decompressed and rendered at a faster rate on the display 70. In yet another embodiment in which the device 40 is within the same housing as the display 70 (i.e., within a smartphone), the video surveillance camera 20 can send the digital video stream 25 at a fixed real-time rate, and the output rate control can be performed within the smartphone itself. In addition, the video buffer 50 may reside in the same device 40 as the output rate control 60 or in a different device (i.e., both can reside in a smartphone, one can reside in the network the other in the smartphone, or both can reside in the network).

Figure 2A:
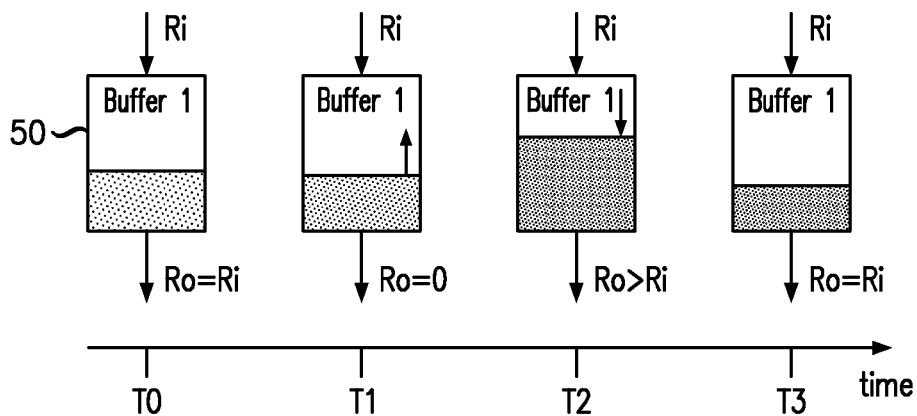
FIGS. 2A-2C are timing diagrams illustrating exemplary embodiments for controlling the packet output flow rate of a digital video buffer.

To illustrate how the packet output flow rate can vary over time, reference is now made to FIG. 2A. As shown in FIG. 2A, a digital video stream from a remote surveillance camera streams into a buffer 50 at a normal fixed rate of Ri frames/second. The data in the buffer 50 can be either compressed (i.e., MJPEG, H264, or other compression technique) or decompressed video. The buffered video streams out of the buffer 50 at a rate of Ro frames/second. The depth of the buffer is typically non-zero. For example, video may stream-in at a rate of Ri=30 frames/sec and stream-out at this same rate of Ro=30 frames/sec, and the total buffer depth may be 60 frames, thus producing 2 seconds of delay. If the output rate Ro matches the input rate Ri, the buffer depth remains fixed, as depicted in FIG. 2A at time T0, where the level of the buffer is neither falling nor rising.

In accordance with embodiments of the present invention, the buffer's output rate is controllable, whereas the input rate is typically fixed from the camera source. Thus, the output rate Ro is actually a function of time, Ro(t). For example, at some time T1, the buffer output rate Ro is set to zero. Although the buffer depth begins to increase, no video is actually lost. Rather, it is temporarily stored in the buffer 50, provided there is adequate buffer memory available.

At some time later T2, the buffer output flow rate is re-adjusted to a rate faster than Ri (Ro>Ri). The depth of the buffer 50 begins to decrease and this decrease can continue, provided that the buffer does not underflow. Finally, at time T3, the output rate is again adjusted to match the input rate (Ro=Ri) and the buffer depth stops changing and remains constant. This process could repeat in time with different rates, buffer depths, pause-times, etc.

The adjustment in output flow rate shown in FIG. 2A enables the video stream to be paused for some time, and then later played-out at a faster-than-real-time rate without any gaps in the data, provided that that delay, or buffer depth, does not represent a problem. The impact of the delay on security is dependent on the specific surveillance usage-case. However, in many cases, a small delay still allows a security team to take appropriate measures and actions when an event is observed in a delayed stream.

Figure 2B:
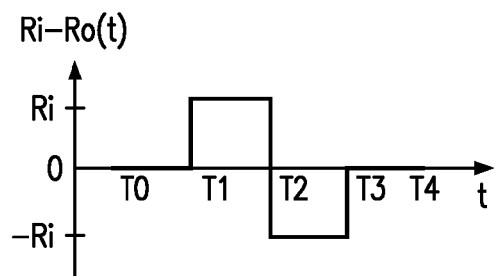

FIG. 2B represents a simple example of how the output flow changes over time. Whenever Ri–Ro(t) is greater than 0, the buffer depth increases, and whenever Ri–Ro(t) is less than 0, the buffer depth decreases. The area under the curve between any two points in time represents the net change in buffer depth. As can be seen from FIG. 2B, the play-out rate can be zero, equal to the input rate, or twice as fast as the input rate, with no net change in the delay.

Figure 2C:
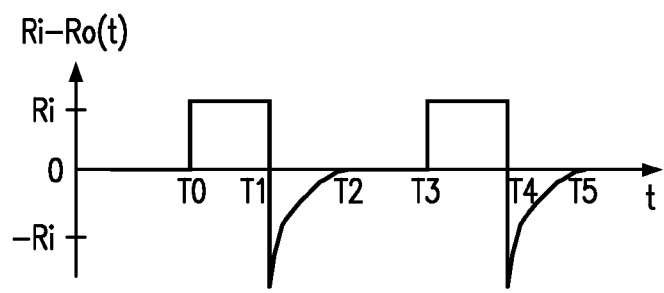

Turning now to FIG. 2C, the output flow rate can also be adjusted to other non-constant, non-discrete values. For example, FIG. 2C depicts how the video stream can be paused (T0 to T1 region), and then played-out at a variable rate that at first exceeds Ri and then smoothly approaches Ri. A user observing this video stream would see a pause, then the older video played out at faster rate and more recent video played-out at a rate approaching near real-time.

Figure 3:
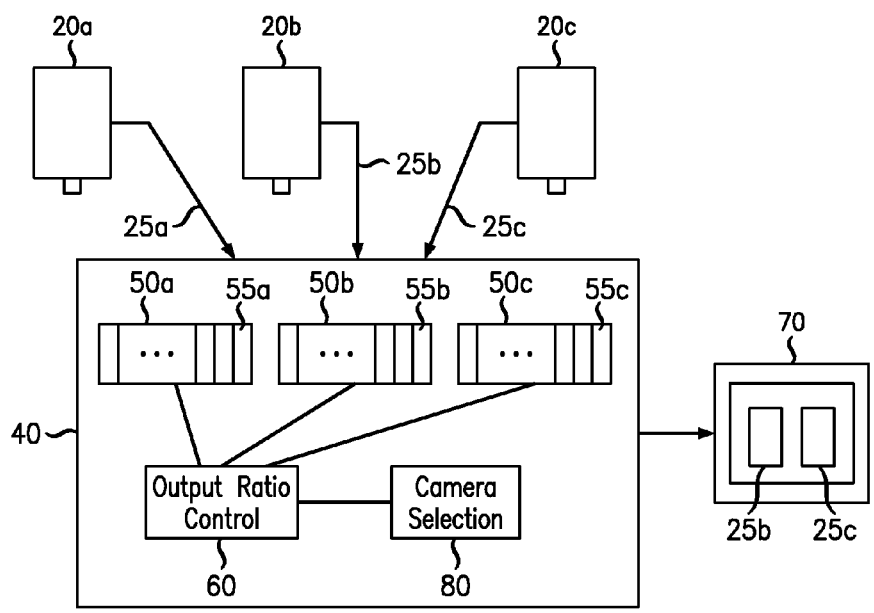
FIG. 3 illustrates another exemplary digital video system for controllably viewing multiple digital video streams captured by multiple remote surveillance cameras, in accordance with embodiments of the present invention.

FIG. 3 is a multi-channel version of the simple system depicted in FIG. 1. In FIG. 3, three different remote video surveillance cameras 20a, 20b and 20c each provide a respective digital video stream 25a, 25b and 25c to the digital video management device 40. The digital video management device 40 includes a respective buffer 50a, 50b and 50c for buffering and storing packets 55a, 55b and 55c each of the video streams 25a, 25b and 25c, and the output rate control module 60 controls the packet output flow rate of each of the buffers 50a, 50b and 50c for rendering on the display 70.

The digital video management device 40 further includes a camera selection module 80. The camera selection module 80 selects which video streams to show on the display 70. The output rate control module 60 pauses the channels (digital video streams) not currently selected by the camera selection module 80 for display. For example, as shown in FIG. 3, the camera selection module 80 can pause the digital video stream 25a from video surveillance camera 20a and render only digital video streams 25b and 25c from cameras 20b and 20c on the display 70. One or both of these displayed video streams 25b and 25c can be rendered in real-time, slower-than-real-time or faster-than-real-time, depending on the output flow rate selected by the output rate control module 60. Both the camera selection module 80 and the output rate control module 60 accept as input policy specification, video analytics, and user GUI (graphical user interface) instructions to determine the selected streams 25a-25c and associated packet output flow rates.

In one embodiment, each buffer 50a-50c may be used for multiple smartphones (or other mobile or non-mobile clients), each using a different pointer within the buffers 50a-50c. In another embodiment, as described above, the buffers 50a-50c may exist within the smartphone itself, so that each camera 20a-20c sends its respective digital video stream 25a-25c at a fixed rate of Ri frames/sec to one or more smartphones, and the buffer pointer management is performed within the smartphone. In this embodiment, the device 40 is implemented within the smartphone.

Similarly, the output rate control module 60 and camera selection module 80 may reside with the smartphone (or other mobile or non-mobile client) or within a server in the network that communicates with the smartphone or other client. The buffers 50a-50c may reside in the same device as the output rate control and camera selection modules 60 and 80 or in a different device.

Figure 4:
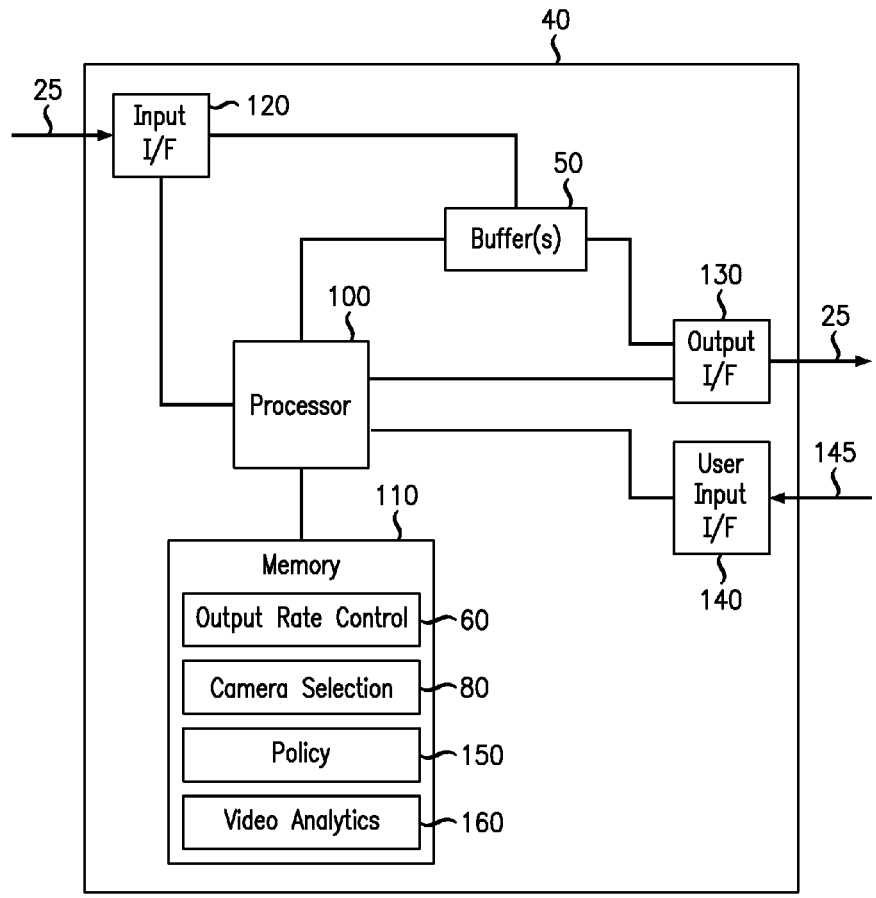
FIG. 4 is a block diagram illustrating an exemplary digital video management device for controlling the packet output flow rate of a digital video stream, in accordance with embodiments of the present invention.

FIG. 4 is a block diagram of an exemplary digital video management device 40, in accordance with embodiments of the present invention. The device 40 includes a processor 100, memory 110, buffer(s) 50, network input interface (I/F) 120, output I/F 130 and user input I/F 140. The network input interface 120 is coupled to a packet-switched (IP) or other type of communication network to receive digital video streams 25 from remote video surveillance cameras. The output I/F 130 is coupled to provide the digital video stream 25 to a display device for rendering thereon. The user input I/F 140 is coupled to receive user GUI (graphical user interface) instructions 145 from a user of the display device.

In one embodiment, the output I/F 130 and user input I/F 140 are coupled to another communication network. For example, the output I/F 130 can transmit the digital video stream 25 (compressed or uncompressed) to a smartphone or other client via the communication network. As another example, the user input I/F 140 can receive user GUI instructions 145 from the smartphone or other client via the communication network. In another embodiment, the output I/F 130 and user input I/F 140 are incorporated within the smartphone or other client and provide internal interfaces to/from the client display and GUI.

The memory 110 maintains the output rate control module 60 and the camera selection module 80, and the processor 100 is further coupled to the memory 110 to execute instructions of the output rate control and camera selection modules 60 and 80. For example, the processor 100 can execute instructions of the camera selection module 80 to select one or more input digital video streams 25 received via network input I/F 120 to output to the display via output I/F 130. The processor 100 can further execute instructions of the output rate control module 60 to store packets of each of the input digital video streams 25 in buffer(s) 50 and to control the packet output flow rate of each of the buffer(s) 50. For example, the processor 100 can execute instructions of the output rate control module 60 to pause (i.e., set the packet output flow rate to zero) any digital video streams not selected by the camera selection module 80.

As used herein, the term "processor" is generally understood to be a device that drives a general-purpose computer, such as a PC. It is noted, however, that other processing devices, such as microcontrollers, Field Programmable Gate Arrays (FPGAs), Application Specific Integrated Circuits (ASICs), Digital Signal Processing chips, or a combination thereof, can be used as well to achieve the benefits and advantages described herein. In addition, as used herein, the term "memory" includes any type of data storage device, including but not limited to, a hard drive, random access memory (RAM), read only memory (ROM), flash memory or other type of storage device or storage medium.

The memory 110 further maintains policy information 150 and/or video analytics information 160. Policy information 150 may be programmed by a user or administrator of the system or may be pre-determined based on buffer characteristics, network characteristics and/or other factors. Likewise, video analytics information 160 may be programmed by a user or administrator or pre-determined based on a number of different factors.

Policy information 150 may be input to both the camera selection module 80 and the output rate control module 60 to control the camera selection and output rate control functions. For example, the policy information 150 may dictate that two streams (streams A and B) out of a total of three streams (streams A, B and C) are to be displayed at any one time for an interval of 5 seconds, each with play-out compensation. As an example, streams A and B, streams B and C, streams C and A, can be toggled with fixed faster-than-real-time rendering, so that there is no net buffer depth increase. As another example, the policy information 150 may require that older video is played-out faster than more recent video, or stream A may have a different play-out rate than stream B. The policy information 150 may also adaptively adjust the play-out interval for each video stream. For example, the policy information 150 may indicate that within the first minute, stream A is to be played for 10 seconds and stream B is to be played for 5 seconds, and within the second minute, stream A is to be played for 5 seconds and stream B is to be played for 10 seconds. It should be understood that there are many other possibilities and variations for how the policy information 150 can control the camera selection module 80 and output rate control module 60.

In addition to policy information 150, video analytics information 160 may also be input to the camera selection module 80 and output rate control module 60 to control which streams 25 are rendered and at what rates. For example, streams 25 that have a lot of motion content may be played 75% of the time at slower speeds, whereas streams 25 that have less motion content may be played 25% of the time at faster speeds. Streams 25 that contain no motion content may even be skipped altogether, or just periodically displayed, thereby allowing displays with limited real estate to be used for streams 25 having motion. In embodiments in which motion occurs in a non-selected stream (i.e., a stream 25 previously selected by the camera selection module 80 to be skipped), the output rate control module 60 can override the camera selection module 80 to show the motion prior to, during and after its occurrence.

Other video analytics 160, such as object detection and recognition may also be exploited. For example, if the stream 25 includes moving vehicles, one scheme for camera selection and output rate control might be used, whereas if the stream 25 includes moving people, another scheme for camera selection and output rate control might be used. In addition, if the stream 25 includes non-moving-people, yet another scheme for camera selection and output rate control might be used. It should be understood that there are many other possibilities and variations for how video analytics 160 can control the camera stream selection and buffer output rate control modules 80 and 60.

In addition to policy 150 and video analytics 160, user graphical user interface (GUI) instructions 145 may also be input to the camera selection module 80 and output rate control module 60 via the user input I/F 140 to control which streams are rendered and at what rates. For example, the user may touch one of the streams 25 on the mobile device display to pause it for further study. The user may then un-pause the stream 25 at a later time, and the output rate control module 60 can then adjust the packet output rate flow of the un-paused stream to catch-up to real-time using some R0(*t*) function. When one of the streams 25 is paused by the user, the other streams may also be paused and/or played-out at slower rates, depending on the policy 150 and/or video analytics 160. As another example, the user may select between different profiles, thereby determining the play-out rates of the different streams 25. For example, profile 1 may show streams A-B, B-C, C-A for 5 seconds each, whereas profile 2 may show stream A for 5 seconds, stream B for 5 seconds and stream C for 5 seconds. In addition, profile 3 may toggle between profiles 1 and 2 at some fixed or variable rate. It should be understood that there are many other possibilities and variations for how user GUI instructions 145 can control the camera stream selection module 80 and buffer output rate control module 60.

Furthermore, policy 150, video analytics 160 and user GUI instructions 145 may also interact with each other in various ways to control the camera selection module 80 and output rate flow module 60. For example, when there is simple motion determined by video analytics 160, the policy information 150 may indicate that a first policy's selection and playback scheme should be used, whereas when there is complex motion determined by video analytics 160, the policy information 150 may indicate a second policy's selection and playback scheme should be used. As another example, if a user pauses one stream 25 via GUI instructions 145, video analytics 160 can override and un-pause the stream 25 when motion is detected. As yet another example, if a user selected profile X via GUI instructions 145, after some time (T), the policy information 150 may override the user selected profile and default back to profile Y. It should be understood that there are many other possibilities and variations for policy, video analytics and user GUI interaction to interact with each other, so as to optimally control the camera stream selection and rate control.

Figure 5:
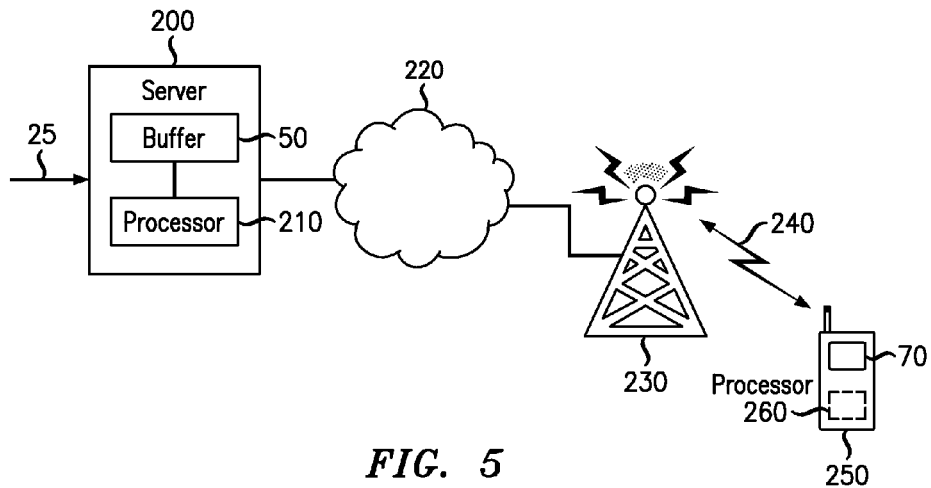
FIG. 5 illustrates an exemplary wireless network for controlling the display of a digital video stream on a mobile communication device, in accordance with embodiments of the present invention.

FIG. 5 illustrates an exemplary wireless network 220 for controlling the display of a digital video stream 25 on a mobile communication device 250, in accordance with embodiments of the present invention. The wireless network 220 includes a network access point 230 (e.g., base station or other network transceiving device) providing a wireless connection 240 to the mobile communication device 250. The mobile communication device can be, for example, a smartphone or other mobile device capable of communicating with the network access point 230. The wireless network can be any type of wireless network, including, but not limited to, Global System for Mobile Communications (GSM), Personal Communications Service (PCS), Wi Fi, Code Division Multiple Access (CDMA) or any other 3G or 4G wireless network.

A server 200 is coupled to the wireless network 220 to receive the digital video stream 25 from a video surveillance camera and to provide the digital video stream 25 to the wireless network 220. The server 200 includes the buffer 50 and a processor 210. The buffer 50 receives and store packets of the digital video stream 25, while the processor 210 controls the output flow rate of the buffer 50 based on policy, video analytics and/or user GUI instructions.

The mobile communication device 250 includes the display 70 and also includes a processor 260. The mobile communication device processor 260 renders the received digital video stream 25 on the display 70 at the packet flow rate set by the server processor 210. For example, if the packets of the digital video stream 25 are received at a faster-than-real-time rate, the processor 260 renders the digital video stream 25 on the display 70 at the faster-than-real-time rate. In one embodiment, the mobile communication device processor 250 receives user GUI instructions via various input devices (e.g., touch screen, keypad, keyboard, stylus or other input device on the mobile communication device) and forwards the user GUI instructions to the server 200 via the wireless network 220 to control the play-out rate of the digital video stream 25 on the display 70.

Figure 6:
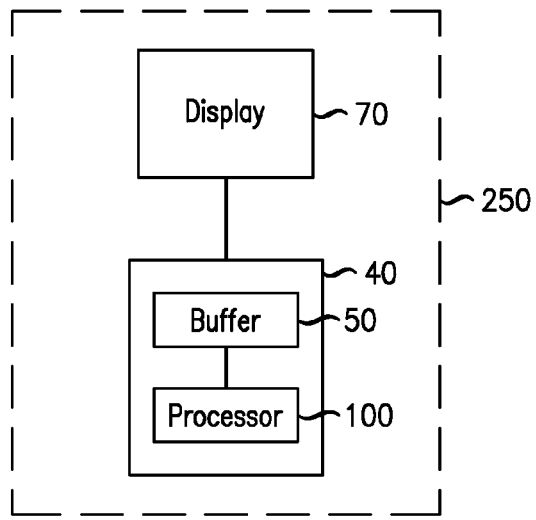
FIG. 6 illustrates an exemplary mobile communication device for controlling the display of a digital video stream thereon, in accordance with embodiments of the present invention.

FIG. 6 illustrates an exemplary mobile communication device 250 for controlling the display of a digital video stream thereon, in accordance with embodiments of the present invention. In FIG. 6, the digital video management device 40 is incorporated within the mobile communication device 250 to enable the mobile communication device to control the play-out rate of the digital video stream on the display 70. As can be seen in FIG. 6, the mobile communication device 250 includes the buffer(s) 50 and the processor 100. The buffer 50 receives and store packets of the digital video stream(s) received by a transceiver (not shown) within the mobile communication device, while the processor 210 controls the output flow rate of the buffer(s) 50 based on policy, video analytics and/or user GUI instructions.

Since a typical mobile communication device 250 has only a low resolution display 70, there is often a loss of spatial information when displaying video from a surveillance camera (especially, a high resolution model) on the mobile communication device 250. For example, critical information about a scene may be concentrated in only a small portion of the frame, while the rest of the frame contains unimportant "background" information.

Figure 7:
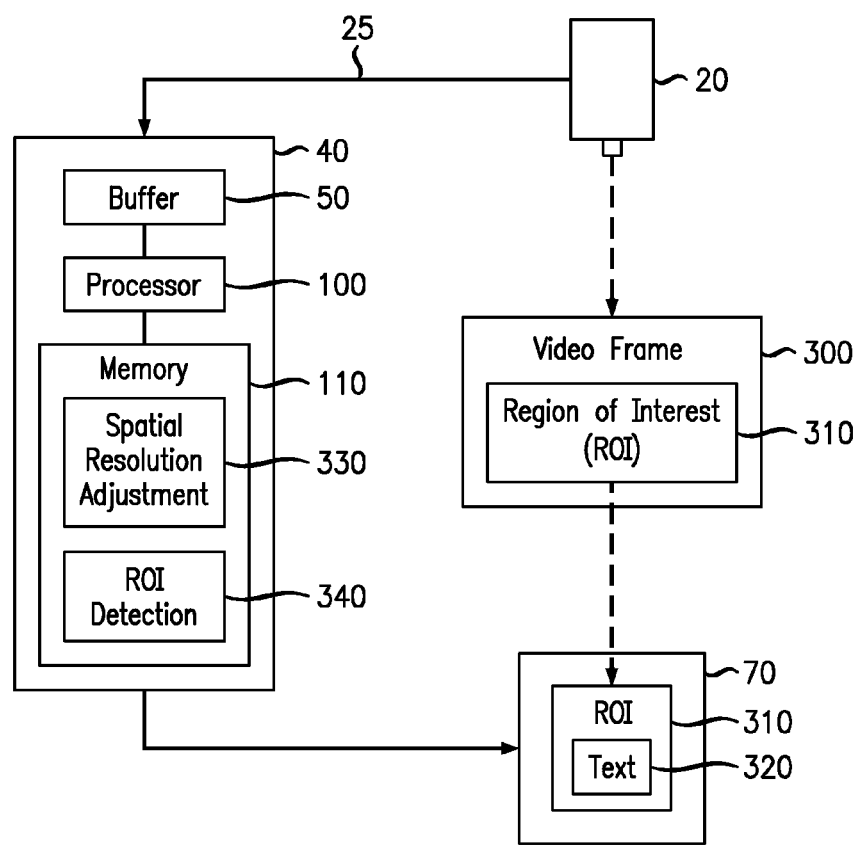
FIG. 7 illustrates an exemplary digital video system for adjusting the spatial resolution of a controlled digital video stream, in accordance with embodiments of the present invention.

Therefore, in further embodiments, the resolution and size of the selected stream(s) displayed on the display 70 are optimally controlled so as to display critical spatial and temporal information. Turning now to FIG. 7, there is illustrated an exemplary digital video system for adjusting the spatial resolution of a controlled digital video stream, thereby minimizing the loss of critical information, in accordance with embodiments of the present invention.

In FIG. 7, the digital video management device 40 is able to detect a particular region of interest (ROI) 310 within a video frame 300 of the digital video stream 25 and display that ROI 310 on the display 70. The digital video management device 40 includes the buffer 50, processor 100 and memory 110. The buffer(s) 50 are coupled to receive digital video stream(s) 25 from remote video surveillance camera(s) 20 and to store packets of the digital video stream(s) therein. The processor 100 operates to select one or more digital video streams for display, control the output flow rate of the buffer(s) 50, detect a ROI 310 within a digital video stream 25 and adjust the spatial resolution of the digital video stream to display the ROI 310 on the display 70. The processor 100 can use, for example, policy, video analytics and user GUI instructions for the selection of the relevant video stream(s), control of output flow rates and the detection and spatial resolution adjustment of the ROI in the selected frame(s).

To provide for ROI detection and spatial resolution adjustment, the memory 110 is shown including a spatial resolution adjustment application 330 and an ROI detection application 340. The processor 100 is coupled to the memory 110 to execute instructions of the spatial resolution adjustment application 330 and ROI detection application 340. For example, the processor 100 can execute instructions of the ROI detection application 340 to detect one or more ROIs 310 within a particular frame 300 of a digital video stream 25. The digital video stream 25 can be a selected digital video stream selected for display on the display 70 or a non-selected digital video stream. In the latter case, upon detecting a ROI 310 within a non-selected digital video stream, the processor 100 may override the decision to not select the digital video stream and render it to the display 70 (e.g., the processor 100 can provide the packets corresponding to the ROI to the display 70). Upon detecting a particular ROI 310, the processor 100 can further crop out unimportant spatial regions of the frame, leaving only the ROI 310 to be rendered on the display 70.

Video analytics can be used to automatically recognize critical information such as faces of wanted criminals, suspicious behavior and unattended suitcases. This information is used by the ROI detection application 340 for the selection of the region of interest (ROI) 310 within the frame 300. In general, the ROI detection process may depend on many factors, such as user input and policy for identification of the ROI 310. For example, a policy may dictate that 2 streams out of a total of 3 streams should be displayed at any one time for an interval of 5 seconds, as long as none of the other streams carries critical information. Another policy may dictate that streams with static content (no motion) be skipped altogether, while streams with critical content are always displayed by fitting their ROIs into the available real estate on the display 70.

The processor 100 can further execute instructions of the spatial resolution adjustment application 330 to adjust the spatial resolution of one or more ROIs 310. For example, the processor 100 can adjust the zoom factor or increase the resolution of the ROI 310. As an example, a super-resolution technique can be used to increase the resolution of an imaging sensor by fusing information from multiple sensors or by using motion. Unlike traditional zooming which blurs the image, super-resolution techniques allow the spatial resolution to be increased, while providing additional information about the scene.

Video analytics and/or policy may also be applied to play-out video with critical content at a slower rate. In addition to policy and video analytics, user graphical user interface (GUI) instructions may also be used to control the spatial resolution of a ROI 310. For example, the user may touch one of the streams on the display 70 to select a ROI and watch that ROI play at super-resolution. It should be understood that there are many other possibilities and variations for how user GUI instructions could control the ROI selection and spatial resolution management.

In another embodiment, video overlay techniques may be used to add additional textual information 320 to the video (e.g., the name of a person can be inserted next to that person's head in the frame 310). For example, video analytics such as object detection and recognition may be exploited, and any extracted knowledge about the scene could be tagged to the video stream as textual information 320. In addition, any extracted knowledge may be compared with a database of critical triggers and be used to automatically activate emergency procedures, such as calling 911 or alerting a supervisor.

The spatial resolution adjustment and ROI detection applications 330 and 340 can be implemented within a network server or within a client device (e.g., smartphone) incorporating the display 70. For example, in embodiments in which the applications 330 and 340 are implemented within the client device, each camera 20 can send its stream at the fixed rate of Ri frames/second, and the camera selection, output flow rate and spatial resolution management would be performed within the client device. In another embodiment, the camera selection process may reside on the network, while the spatial resolution management is performed on the client device.

Figure 8:
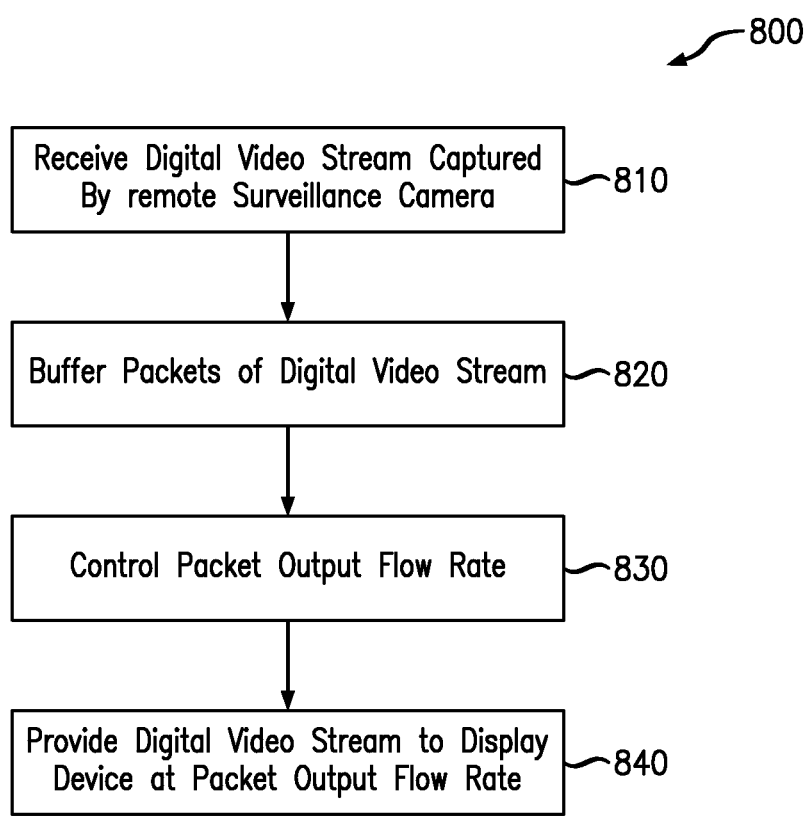
FIG. 8 illustrates an exemplary method for controllably viewing a digital video stream captured by a remote surveillance camera, in accordance with embodiments of the present invention.

FIG. 8 is a flowchart illustrating an exemplary process 800 for controllably viewing digital video streams, in accordance with embodiments of the present invention. The process begins at block 810, where a digital video stream captured by a remote surveillance camera is received. At block 820, packets of the digital video stream are buffered within a buffer. At block 830, a packet output flow rate of the buffer is controlled. For example, the packet output flow rate can be controlled between a zero output rate and a faster-than-real-time output rate by setting the packet output flow rate to the zero output rate at a first time and the faster-than-real-time output rate at a second time subsequent to the first time. Finally, at block 840, the digital video stream is provided to a display device for display thereon at the current packet output flow rate.

As will be recognized by those skilled in the art, the innovative concepts described in the present application can be modified, varied and adapted over a wide range of applications. Accordingly, the scope of patents subject matter is not limited to any of the specific exemplary teachings discussed, but is instead defined by the following claims.

The invention claimed is:

1. A digital video management device for controllably viewing digital video streams, comprising:
an input interface coupled to a packet-switched network to receive a digital video stream captured by a remote surveillance camera;
a buffer for receiving and storing packets of the digital video stream;
a processor configured to set a packet output flow rate of the buffer to a variable output rate that is variable between a zero output rate and a faster than real-time output rate, the variable output rate being determined, at least in part, using video analytics; and
an output interface configured to provide the digital video stream to a display device for display thereon at the variable output rate such that all received packets, exclusive of any packets removed from the buffer due to a buffer overflow condition and without regard to the format of individual received packets, are output in the digital video stream provided to the display device, wherein the variable output rate includes a rate other than a real-time output rate.

2. The digital video management device of claim 1, wherein the processor further uses a current depth of the buffer to determine the variable output rate.

3. The digital video management device of claim 1, wherein the input interface is further coupled to receive at least one additional digital video stream captured by at least one additional remote video surveillance system, and further comprising:
at least one additional buffer for receiving and storing packets of the at least one additional digital video stream, the processor further configured to set the packet output flow rate of the at least one additional buffer to a second variable output rate to enable selected digital video streams of the digital video stream and the at least one additional digital video stream to be concurrently rendered on the display device.

4. The digital video management device of claim 3, wherein the processor further pauses non-selected digital video streams of the digital video stream and the at least one additional digital video stream by setting the packet output flow rate of the non-selected digital video streams to the zero output rate.

5. The digital video management device of claim 3, wherein the processor uses one or more of a predetermined policy, video analytics or user input of a user of the display device to determine each of the selected digital video streams and the respective packet output flow rates of the selected digital video streams.

6. The digital video management device of claim 5, wherein the processor further adjusts a spatial resolution of the selected digital video streams to display one or more regions of interest within the selected digital video streams on the display device.

7. The digital video management device of claim 6, wherein the processor adjusts the spatial resolution by zooming in on the one or more regions of interest, increasing the resolution of the one or more regions of interest using a super-resolution technique or resizing the one or more regions of interest.

8. The digital video management device of claim 6, wherein the processor further adds a textual video overlay to the one or more regions of interest.

9. The digital video management device of claim 1, wherein the digital video management device includes one or more of a server within the packet-switched network or a mobile device having the display device thereon.

10. A method for controllably viewing digital video streams, comprising:
receiving a digital video stream captured by a remote surveillance camera;
buffering packets of the digital video stream within a buffer;
setting a packet output flow rate of the buffer to a variable output rate that is variable between a zero output rate and a faster than real-time output rate;
applying video analytics to determine, at least in part, the variable output rate; and
providing the digital video stream to a display device for display thereon at the variable output rate such that all received packets, exclusive of any packets removed from the buffer due to a buffer overflow condition, are provided in the digital video stream, wherein the variable output rate includes a rate other than a real-time output rate.

11. The method of claim 10, further comprising:
receiving at least one additional digital video stream captured by at least one additional remote video surveillance system;
buffering packets of the at least one additional digital video stream within at least one additional buffer; and
controlling the packet output flow rate of the at least one additional buffer to enable selected digital video streams of the digital video stream and the at least one additional digital video stream to be concurrently rendered on the display device.

12. The method of claim 11, further comprising:
pausing non-selected digital video streams of the digital video stream and the at least one additional digital video stream by setting the packet output flow rate of the non-selected digital video streams to the zero output rate.

13. The method of claim 11, further comprising:
determining the selected digital video streams and the respective packet output flow rates of the selected digital video streams using one or more of a predetermined policy, video analytics or user input of a user of the display device.

14. The method of claim 13, further comprising:
adjusting a spatial resolution of the selected digital video streams to display one or more regions of interest within the selected digital video streams on the display device.

15. The digital video management device of claim 1, wherein the processor sets the variable output rate to a slower than real-time rate when the video analytics determines that one or more packets in the buffer contain motion content.

16. The method of claim 10, wherein the variable output rate is set to a slower than real-time rate when the video analytics determines that one or more packets in the buffer contain motion content.

* * * * *